United States Patent [19]

Wu et al.

[11] Patent Number: 4,897,720

[45] Date of Patent: Jan. 30, 1990

[54] CIRCUIT IMPLEMENTATION OF BLOCK MATCHING ALGORITHM

[75] Inventors: Lancelot Wu, Morristown; Kun-Min Yang, Parsippany, both of N.J.

[73] Assignee: Bell Communications Research, Inc., Livingston, N.J.

[21] Appl. No.: 167,327

[22] Filed: Mar. 14, 1988

[51] Int. Cl.⁴ .......................................... H04N 7/137
[52] U.S. Cl. .................................. 358/136; 358/135
[58] Field of Search .............. 358/136, 135, 105, 138, 358/160, 133; 382/56; 325/122, 23; 321/37, 41

[56] References Cited

U.S. PATENT DOCUMENTS 4,800,425 1/1989 Schwerzel et al. ................. 358/136

FOREIGN PATENT DOCUMENTS 0309251 3/1989 European Pat. Off. .
2172171 9/1986 United Kingdom .

OTHER PUBLICATIONS

"Machine Perception of Visual Motion", Buxton et al., *GEC Journal of Research*, vol. 3, #3, 1985.
"Motion-Compensation Interframe Coding for Video Conferencing"; T. Koga et al; NTC 81 Proc.; pp. 65.3.1–65.3.5, New Orleans; Nov. 29–Dec. 3, '81.
"A VSLI for Motion Compensation"; G. Roth et al.; PCS 87; pp. 13.1–13.2.
"Motion Compensated Television Coding: Part I", A. N. Netravali et al., BSTJ, vol. 58, pp. 631–670, Mar. 1979.
"Pel-Recursive Motion Compensated Color Codes", K. A. Prabhu et al., Proceedings of ICC 88, pp. 2G.8.1–2G.8.5, Jun. 1982.
"Displacement Measurement and Its Application in Interframe Image Coding", J. R. Jain et al., IEEE Transactions on Communications, vol. Com-29, No. 12, pp. 1799–1808, Dec. 1981.

*Primary Examiner*—James J. Groody
*Assistant Examiner*—Victor R. Kostak
*Attorney, Agent, or Firm*—James W. Falk

[57] ABSTRACT

A circuit for implementing a full search block matching algorithm for coding video signals sequentially receives pixel values from a block of pixels in a current video frame and sequentially receives pixel values from a search area of a previous video frame. The circuit includes a plurality of processors for calculating in parallel a group of error functions corresponding to a group of positions of the block in the search area. The error functions are compared for determining the block position having the minimum error function.

14 Claims, 5 Drawing Sheets

| t | INPUT DATA | $\Sigma\|a(k,l)-b(k,l)\|$ | $\Sigma\|a(k,l)-b(k,l+1)\|$ | ... | $\Sigma\|a(k,l)-b(k,l+15)\|$ | $\Sigma\|a(k,l)-b(k,l+16)\|$ |
|---|---|---|---|---|---|---|
| 0 | a(0,0), b(0,0) | $\|a(0,0)-b(0,0)\|$ | | | | |
| 1 | a(0,1), b(0,1) | $\|a(0,1)-b(0,1)\|$ | $\|a(0,0)-b(0,1)\|$ | | | |
| 2 | a(0,2), b(0,2) | $\|a(0,2)-b(0,2)\|$ | $\|a(0,1)-b(0,2)\|$ | $\|a(0,0)-b(0,2)\|$ | | |
| ... | ... | | | | | |
| 15 | a(0,15), b(0,15) | $\|a(0,15)-b(0,15)\|$ | $\|a(0,14)-b(0,15)\|$ | | $\|a(0,0)-b(0,15)\|$ | |
| 16+0 | a(1,0), b(1,0), b(0,16) | $\|a(1,0)-b(1,0)\|$ | $\|a(0,15)-b(0,16)\|$ | | $\|a(0,1)-b(0,16)\|$ | $\|a(0,0)-b(0,16)\|$ |
| 16+1 | a(1,1), b(1,1), b(0,17) | $\|a(1,1)-b(1,1)\|$ | $\|a(1,0)-b(1,1)\|$ | | | |
| ... | ... | | | | | |
| 16+15 | a(1,15), b(1,15), b(0,31) | $\|a(1,15)-b(1,15)\|$ | $\|a(1,14)-b(1,15)\|$ | | $\|a(1,0)-b(1,15)\|$ | $\|a(0,0)-b(1,15)\|$ |
| 2×16+0 | a(2,0), b(2,0), b(1,16) | $\|a(2,0)-b(2,0)\|$ | $\|a(1,15)-b(1,16)\|$ | | | |
| ... | ... | | | | | |
| 15×16+0 | a(15,0), b(15,0), b(14,16) | | | | | |
| ... | ... | | | | | |
| 15×16+15 | a(15,15), b(15,15), b(14,31) | $\|a(15,15)-b(15,15)\|$ | $\|a(15,14)-b(15,15)\|$ | | | |
| 16×16+0 | b(15,16) | | $\|a(15,15)-b(15,16)\|$ | | $\|a(15,14)-b(15,16)\|$ | |
| 16×16+1 | b(15,17) | | | | $\|a(15,15)-b(15,17)\|$ | |
| ... | ... | | | | | |
| 16×16+15 | b(15,31) | | | | | $\|a(15,15)-b(15,31)\|$ |

CIRCUIT IMPLEMENTATION OF BLOCK MATCHING ALGORITHM

FIELD OF THE INVENTION

The present invention relates to a technique for video data compression known as motion compensation. More particularly, the present invention relates to a VLSI implementation of a block matching algorithm with full search capability for detecting and compensating differences between successive video frames caused by motion.

BACKGROUND OF THE INVENTION

Television signals with a scanning rate of 30 frames per second contain a significant amount of frame-to-frame redundancy. For video conferencing applications, in particular, motion in a scene is usually low so that the frame to frame data redundancy is high. In such a case, coding techniques can be used to reduce the frame to frame data redundancy and achieve a high degree of data compression.

Consider first and second successive video frames arising in a video conferencing application. Illustratively, the difference between the two successive frames results from motion of an object such as the arm or hand of a person. If this motion is confined to a small region of the frame and if the first frame is available at the receiver, then instead of transmitting the entire second frame to the receiver, it is only necessary to transmit the motion information to the receiver. Upon receipt of the motion information, the receiver is able to construct the second frame from the first. In particular, the motion information is obtained by estimating the displacement of the moving object between the second frame and the first frame. The estimated displacement is then transmitted to the receiver so that the receiver can construct the second frame from the first.

Using this method of transmitting video data, it is necessary to transmit the full frame data for only one out of every two frames so that a significant amount of data compression is achieved. This technique of data compression is called motion compensation and plays an important role in various video codecs.

Several methods for estimating the displacement of an object in a video sequence have been proposed. Generally, they can be classified into two types, pixel recursive algorithms (see. e.g. A. N. Netravali et al. "Motion Compensated Television Coding: Part I" BSTJ Vol. 58, pp. 631-670, Mar. 1979; and K. A. Probhu et al. "Pel-Recursive Motion Compensated Color Codes", Proceedings of ICC 82 pp. 2G.8.1-2G.8.5, Philadelphia, PA, June 1982) and block matching algorithms (see e.g. J. R. Jain et al. "Displacement Measurement and Its Application in Interframe Image Coding" IEEE Trans on Commun., Vol. COM-29, pp. 1799-1808, Dec. 1981). Here, the concern is with block matching algorithms.

In a block matching algorithm, the current (i.e. the second) frame is divided into blocks of pixels. For example, if a frame is 256×256 pixels, it may be divided into two hundred and fifty-six MxN blocks where M and N are both 16 pixels. The purpose of the block matching algorithm is to obtain a displacement vector for each block of pixels in the current frame. A displacement vector indicates the displacement of a block relative to its location in the previous (i.e. the first) frame. These displacement vectors are then transmitted to the receiver so that the receiver can construct the current (i.e. the second) frame from the previous (i.e. the first) frame. In applications with relatively low motion levels, such as a video conference, many of the displacement vectors are zero.

To calculate a displacement vector for a block of pixels in the current frame, a similarity calculation is performed between the block of the current frame and each of a plurality of equal sized blocks laid out in a generally larger search area of the previous frame. The block of pixels in the current frame and the search area in the previous frame generally have the same center. An error function such as the mean absolute error or mean square error is calculated as a similarity measurement for each position of the block of the current frame in the search area. The displacement vector is the displacement between the center of the search area and the center of the block in the search area which yields the minimum error when compared with the block from the current frame.

More particularly, a search area in a previous frame is searched by placing a block of pixels from the current frame at the upper left-hand corner of the search area and calculating the error (mean square or mean absolute) with respect to the overlapped pixels in the search area. The block from the current frame is then moved pixel by pixel to the right-hand boundary of the search area. At each step the error with respect to the overlapped pixels of the search area is calculated. The block of the current frame is then moved down one row of pixels in the search area, and the block is again moved pixel by pixel from the left-hand boundary of the search area to the right-hand boundary, at each step the error with respect to the overlapped pixels of the search area being calculated. The block of pixels from the current frame is then moved down another row and moved from left to right pixel by pixel etc. This process is continued until an error function (mean square or mean absolute) is calculated for all possible block positions in the search area. (Hence the name, full search block matching algorithm). The calculated mean errors are compared and the block position that produces the minimum error defines the displacement vector for the block.

The full search block matching procedure described above demands a very large amount of computation. Consider, for example, the specifications:

image size = 256×256 pixels;
frame rate = 15 frames per second;
block size in current frame = MxN where M = 16 and N = 16; and
search area size in previous frame = $(M+2T)(N+2T)$ where
T = 8 pixels;

The full search procedure for each block in the current frame requires $(2T+1)^2 = 289$ distinct mean error calculations involving the block of pixels from the current frame and an overlapping block of pixels from the search area. Each such error calculation requires 255 additions since there are 256 pixels in each block. To accomplish the task for the entire current frame of 256 blocks in 1/15 seconds, an 8-bit wide adder must perform additions in 3.5 nanoseconds if the additions are done sequentially. This is a very severe speed requirement. If the motion compensation techniques were to be applied to an NTSC signal comprising 512×512 pixels (rather than 256×256 pixel example as described above) the speed of the adder would have to be 0.4375 ns, a speed clearly unapproachable using currently available technology. In addition, the access time of the memories storing the pixel values is of same order as the adder time. Such access time cannot be readily achieved with current technology.

In light of the severe computational demands of the full search block matching procedure, some fast but non-full-search algorithms have been proposed. (See e.g. J. R. Jain et al. "Displacement Measurement and Its Application in Interframe Image Coding", IEEE Trans on Commun., Vol. Com-29, pp. 1799–1808 Dec. 1981; and T. Koga et al. "Motion Compensation Interframe Coding for Video Conferencing", NTC 81 Proc. pp, G5.3.1–G5.3.5, New Orleans, LA, Nov. 29-Dec. 3, 1981.) Although these simplified, but non-full, searching methods reduce the computational burden, they do not provide optimal implementation of the block matching algorithm. It is recognized that the performance of the full search block matching procedure is the best among all block matching search procedures. For low-bit rate (e.g. 64–128 kb/sec) video, the difference in performance between the full search and non-full search algorithms can be significant.

In Roth et al., "A VLSI for Motion Compensation", pp. 13.1–13.2 PCS 87, a VLSI chip for implementing a full search block matching algorithm is disclosed. The chip is designed for processing 8×8 blocks. The data flow within the chip requires a lot of buffer capacity which causes the chip to have a relatively large size. This prevents the design of the Roth et al. reference for being practical for processing a block larger than 8×8 pixels. If a chip that is capable of processing 16×16 blocks is needed, then the design in the Roth et al. reference results in a chip having a size that is beyond reasonable cost and which may also involve unacceptable processing delays.

Accordingly, it is an object of the present invention to provide a circuit, implementable in VLSI, for carrying out a full search block matching algorithm for the compression of video data. It is a further object of the present invention to provide a VLSI circuit of reasonable size and cost for implementing a block matching algorithm, which algorithm can efficiently handle both 8×8 and 16×16 pixel blocks.

SUMMARY OF THE INVENTION

In a particular embodiment, the present invention is a circuit formed as a single VLSI chip for implementing a full search block matching algorithm. The circuit incorporates a highly efficient data flow design which enables the circuit to be of small size, high speed and utilize highly parallel processing.

In accordance with the present invention, a circuit for implementing a full search block matching algorithm receives the pixel values comprising the block from the current frame and the pixel values comprising the search area of the previous frame sequentially. Thus the circuit requires a relatively small number of pins and has a relatively small area so that it is of reasonable cost.

The circuit of the present invention uses parallel processing to take advantage of the fact that the mean square or mean absolute error calculations for adjacent positions of a block from the current frame in a search area of the previous frame utilize a significant number of pixel value inputs in common. Thus, in accordance with the present invention, a plurality of processors calculates in parallel the mean square error or the mean absolute error arising from a plurality of block positions in the search area. For example, the errors (mean square or mean absolute) of the block positions arrived at by moving the block of the current frame horizontally pixel by pixel from the left-hand boundary of the search area to the right-hand boundary may be calculated in parallel. (In other words, the errors for one row of block positions in the search area are calculated in parallel.) Each of the processors performs an error calculation for one position of the block (of the current frame) in the search area (of the previous frame). The circuit of the present invention includes internal bus structures for transporting the pixel values of the current and previous frames to the processors so that the error calculations for the plurality of block positions can proceed in parallel. A first bus structure is used for pipelining pixel values of the current frame to the processors and a second bus structure is used to broadcast pixel values of the previous frames to the processors.

After the error calculations for one row of block positions is complete, the error calculations are performed in parallel for the next row of block positions, e.g. the block positions resulting from shifting the block one pixel downward in the search area. After an error calculation is made for every position of the block in the search area, the vector displacement for the block is determined by determining which block position produced the smallest error.

The circuit is then used to process the next block in the current frame until vector displacements are obtained for all blocks in the current frame.

Thus, while the sequential inputting of pixel values and efficient data flow design result in a chip of small size, the parallel calculations of error values provide a chip which meets the relevant speed criteria, namely, in a 15 frame/sec system, calculating all vector displacements in 1/15 seconds.

DETAILED DESCRIPTION OF THE INVENTION

Figure 1:
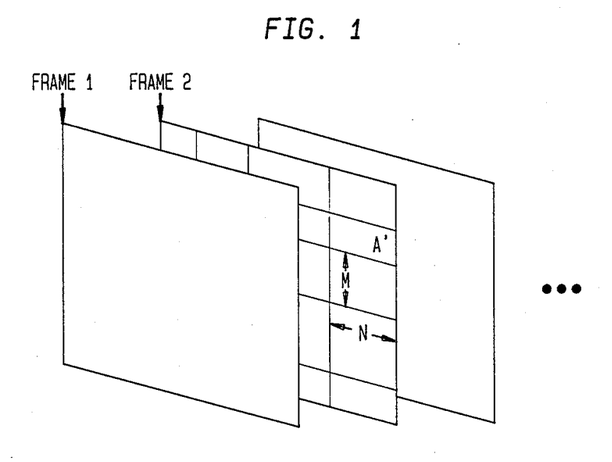
FIG. 1 schematically illustrates a sequence of video frames to be transmitted from a transmitter to a receiver.

FIG. 1 schematically illustrates a sequence of video frames to be transmitted from a transmitter (not shown) to a receiver (not shown). Illustratively, the frames comprise 256×256 pixels and 15 frames are transmitted per second.

As indicated above, for video conferencing applications, motion in a scene is usually low and successive frames contain large amounts of redundant information. Thus an interframe coding technique can be used to reduce the information redundancy between successive frames and achieve significant data compression.

As indicated above, the concern here is with a data compression technique known as motion detection and compensation. If the difference between frames 1 and 2 of FIG. 1 is induced by displacement or motion of an object and this difference is confined to a relatively small region of the frame it is not necessary to transmit the full data of frame 2 to the receiver. Instead it is only necessary to transmit the displacement information to the receiver. The receiver then uses the displacement information to construct frame 2 from frame 1.

As indicated above, the displacement information may be obtained by means of a block matching algorithm. The block matching algorithm measures the similarity between a block of pixels in frame 2 and a plurality of equal sized blocks laid out in a search area of frame 1. Thus as shown in FIG. 1, frame 2 is divided into a plurality of blocks, each comprising MxN pixels. Illustratively, M and N are both equal to 16. For each block of pixels in frame 2, the block matching algorithm provides a displacement vector which indicates the displacement made by the block from a position in frame 1 to its position in frame 2. Thus to implement a motion compensation video data compression algorithm, it is necessary to calculate a displacement vector for each block of pixels in frame 2. The displacement vectors are then transmitted to the receiver, which uses the displacement vectors to construct frame 2 from frame 1.

Figure 2:
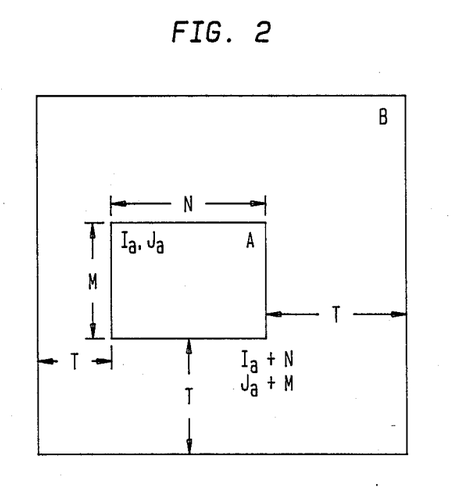
FIG. 2 schematically illustrates a block from a current video frame and a search area in a previous video frame for carrying out a block matching algorithm.
Figure 3:
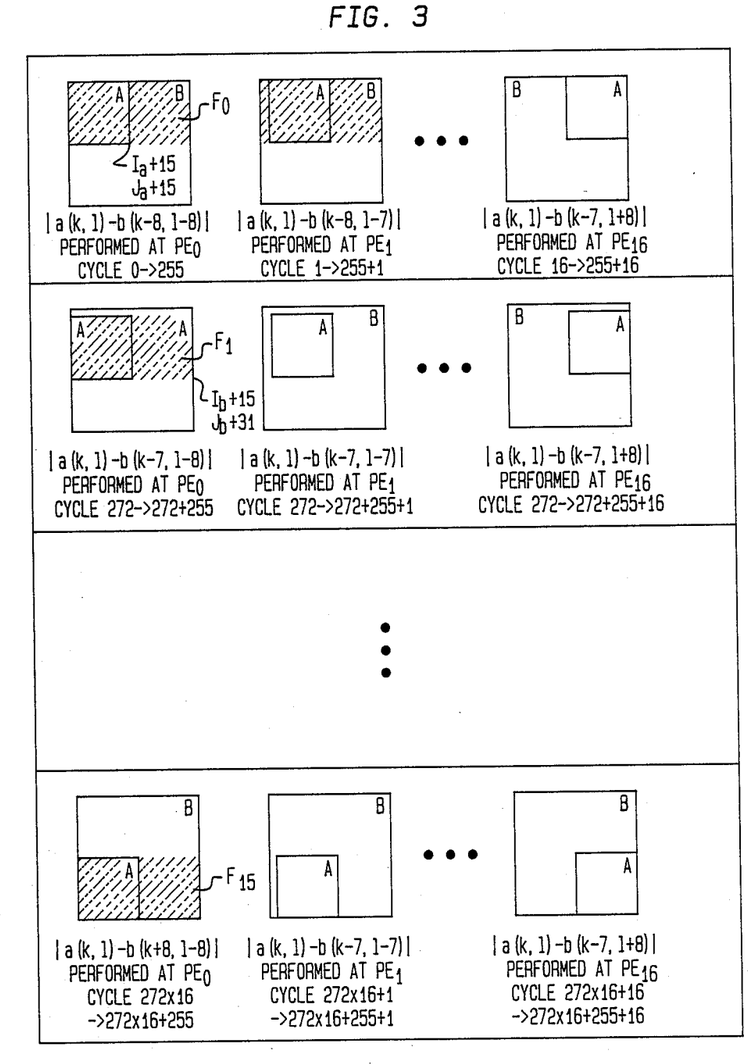
FIG. 3 illustrates the positions a block from the current frame can occupy in the search area of the previous frame.

FIG. 2 schematically illustrates a block of pixels from frame 2 (i.e. the current frame) and a search area from frame 1 (i.e. the previous frame). In FIG. 2, area A represents an MxN block of pixels from the current frame and area B represents a search area from the previous frame. The area of B is (M+2T)(N+2T) where, illustratively, T is eight pixels. Note that block A and block B have the same center. The positions that the block A can take within the search area B are shown in FIG. 3. In FIG. 3 each shift of block A in the horizontal direction is a shift of one pixel and each shift of block A in the vertical direction is a shift of one pixel. Because the block A is 16 pixels wide and the search area is 32 pixels wide when T=8, there are 17 possible positions for block A in the top row of FIG. 3, each of these positions differing from the adjacent ones by one pixel shift horizontally.

To determine the best match for block A in search area B it is necessary to calculate, for example, the mean absolute error or the mean square error between the pixel values of block A and the overlapping pixel values of search area B for every possible position of block A in search area B as shown in FIG. 3. Thus, finding the best match for block A in search area B requires the computation of $(2T+1)^2$ error functions of the form $$\sum_{k}^{M} \sum_{l}^{N} [a(k,l) - b(k + m_k, l + m_l)]^p$$

One error function is calculated for each position of block A in search area B, i.e. for every pixel shift (horizontally) and every line shift (vertically) in the search area. In the foregoing equation, the a(k,l)'s represent the pixel values in block A and the b(k,l)'s represent the pixel values in the search area B. The values $m_k, m_l$ represent the displacement of the block A in the search area B. Thus $-T < m_k, m_l \leq T$ where for example T=8 pixels. Thus, in the upper left-hand corner of FIG. 3, the block A is positioned so that $m_k = -8$ and $m_l = -8$ and $m_l$ are indicated in the algebraic expression below the diagram of the corresponding block position in FIG. 3 which algebraic expressions are of the form $|a(k,l) - b(k+m_k, l+m_l)|$. In addition, in the foregoing equation p=1 corresponds to the mean absolute error, and p=2 corresponds to the mean square error.

After the error for each position of block A in search area B is calculated, the errors are compared and the position of block A resulting in the minimum error is identified. The $m_k, m_l$ value for this position of block A then represents the displacement vector for the block A. In a similar manner a displacement vector is calculated for each block (see FIG. 1) in the current frame.

It is clear from FIG. 3 that the error calculations for adjacent positions of block A in search area B utilize a significant number of pixel value inputs in common. The present invention takes advantage of this to calculate the error functions for a plurality of block positions in parallel.

Thus, in a particular embodiment of the present invention, a circuit is provided for calculating in parallel the error functions for an entire row of positions of block A in the search area B (see FIG. 3). The circuit includes, for example, 17 parallel processors, each being adapted to calculate the error function for one of the 17 positions of block A in each row in FIG. 3. Preferably, the circuit is formed as a single VLSI chip.

Figure 4:
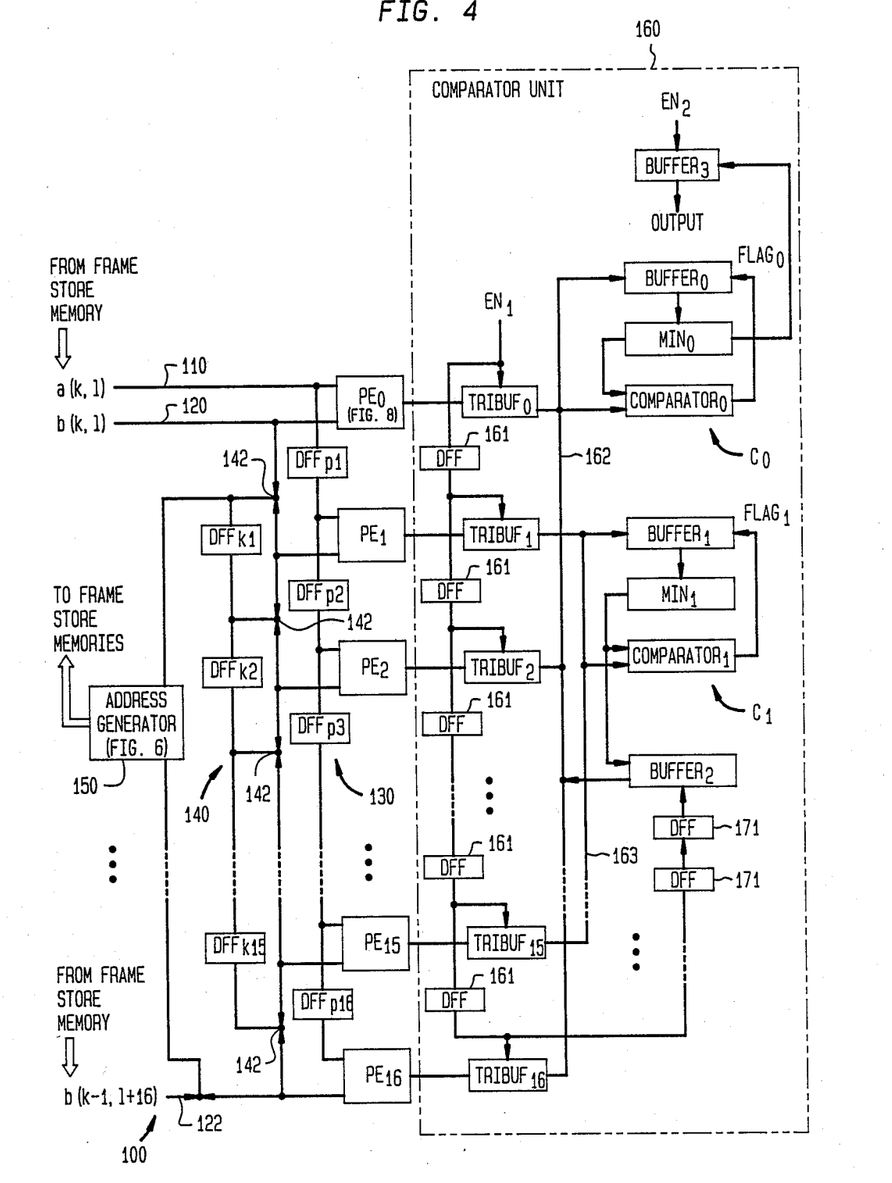
FIG. 4 schematically illustrates a circuit for implementing a block matching algorithm in accordance with an illustrative embodiment of the invention.
Figure 8:
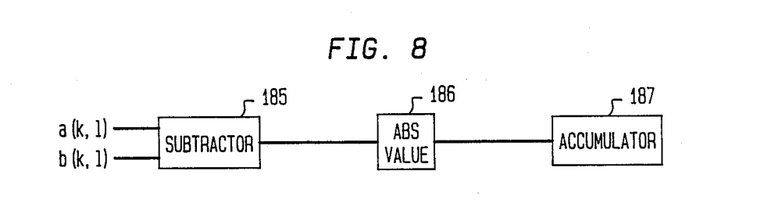
FIG. 8 schematically illustrates one processor out of a plurality of parallel processors comprising the circuit of FIG. 4.

A circuit 100 for implementing a full search block matching algorithm in accordance with the present invention is illustrated in FIG. 4. Illustratively, the circuit 100 comprises seventeen processors $PE_0, PE_1 \ldots PE_{16}$. These processors calculate in parallel, the error functions for one row of block positions in FIG. 3 with each processor calculating the error function for one block position. Such a parallel processing capability enables the block matching algorithm to be carried out rapidly for an entire frame. One of the processors $PE_0 \ldots PE_{16}$ is illustrated in FIG. 8 and is discussed below.

Pixel values from the block of the current frame are received sequentially at the input 110. Pixel values from the search area of the previous frame are received sequentially at the inputs 120 and 122. Because the pixel values are received sequentially, a VLSI chip implementing the circuit 100 requires a relatively small number of pins so that it is reasonable in size and cost.

The bus structure 130 is used to distribute the pixel values from the block of the current frame to the processors. The bus structure 140 is used to distribute pixel values from the search area of the previous frame to the processors. The bus structures 130 and 140 are discussed in greater detail below.

The circuit 100 of FIG. 1 operates in connection with two frames store memories (not shown). One frame memory stores the pixel values of the previous frame and the other frame memory stores the pixel values of the current frame.

Figure 6:
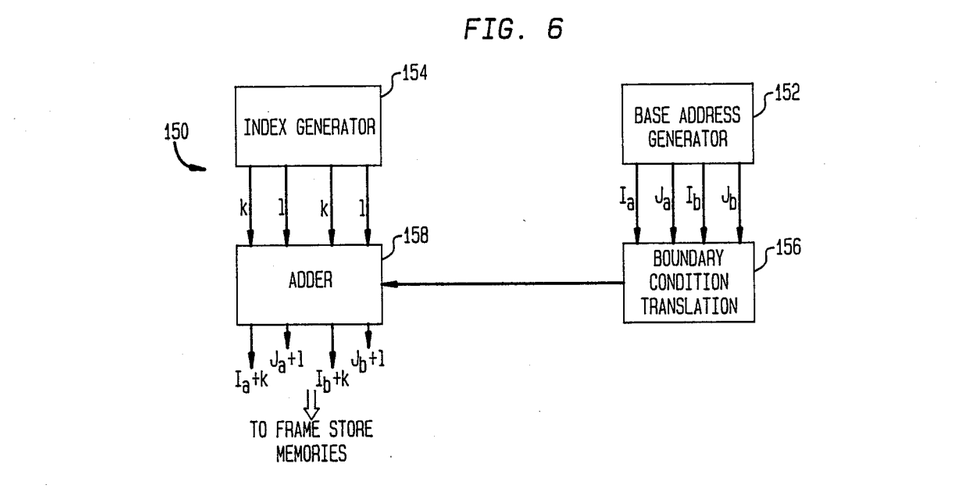
FIG. 6 schematically illustrates an address generator of the circuit of FIG. 4.

Before considering the flow of data in the circuit 100 of FIG. 4 it is useful to consider the following addressing scheme. Illustratively, the upper left-hand corner pixel of the block A is represented by the base address $I_a, J_a$ (see FIG. 2 and FIG. 3). All other pixel addresses in the block A are represented relative to $I_a, J_a$ in the form $I_a+i$, $J_a+j$. Thus if block A is $16\times 16$ then the lower right-hand pixel in the block has the address $I_a+15$, $J_a+15$. In FIG. 3, each shaded area $F_0 \ldots F_{16}$ represents the portion of the search area B involved with one row of positions of block A. For example, the zone $F_{16}$ is involved with the lowermost row of positions of block A in the search area. The upper left-hand corner of each zone F has a base address $I_b, J_b$. All other addresses in the particular zone of the search area are represented relative to the base address in the form $I_b+i$, $J_b+j$. Thus for example, the upper left-hand pixel in the zone $F_l$ has the base address $I_b, J_b$ and the lower-right hand pixel in the zone has the address $I_b+15, J_b+31$. This address scheme means that there is no change in any base address during the parallel error function calculation for each row of positions of block A in search area B. The address generator 150 of the circuit 100 transmits addresses of the form $I_a+i$, $J_a+j$ and $I_b+i$, $J_b+j$ to the frame store memories (not shown) which in turn transmit pixel values to the inputs 110,120,122 of the circuit 100 of FIG. 4. $a(I_a+i,J_a+j)$ is a pixel value from a block of current frame and $b(Ib+i,J)$ is a pixel value from a search area of a previous frame. The circuitry forming the address generator is schematically illustrated in FIG. 6 and is discussed below.

Figure 5:
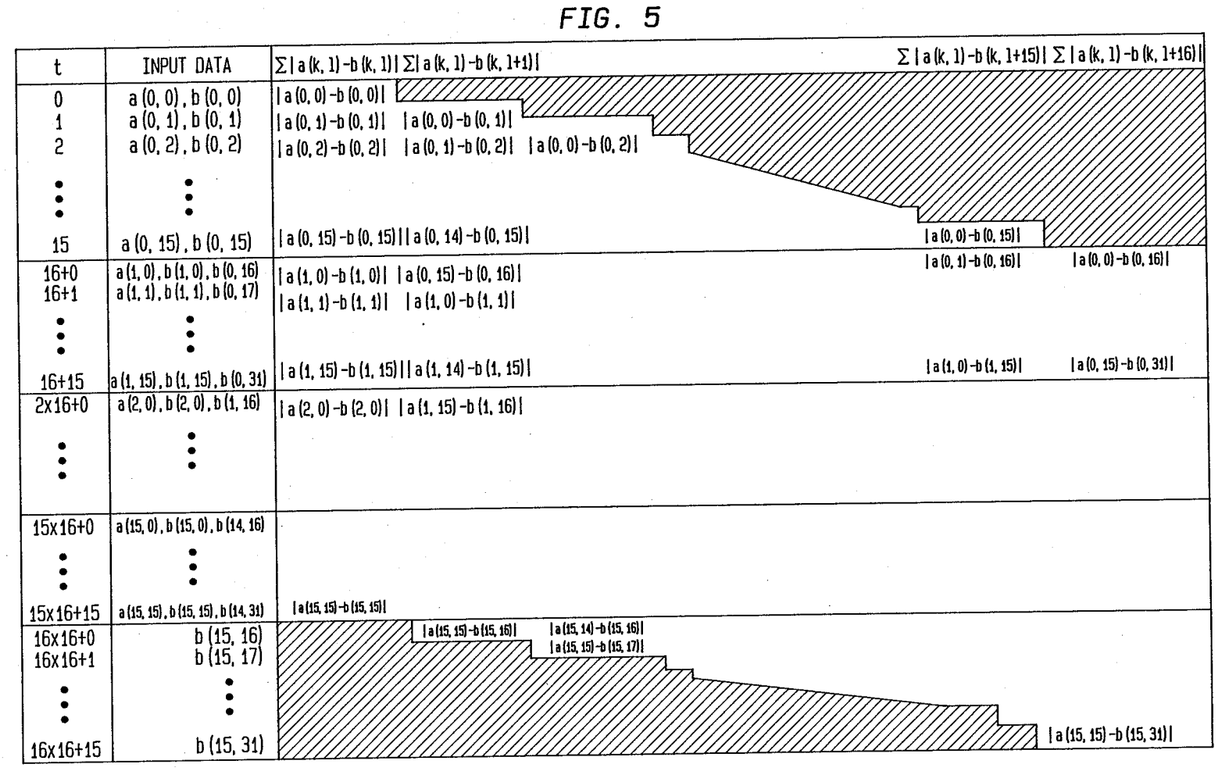
FIG. 5 schematically illustrates a timing diagram for the circuit of FIG. 4.

The data flow in the circuit 100 including the sequence in which pixel values arrive at the inputs 110,120,122 may be understood by looking at data flow timing diagram of FIG. 5. In particular, FIG. 5 provides the data flow involved in the parallel calculation of the error functions for one row of positions of the block A in the search area B such as for example the top row of FIG. 3. Thus, the full search block matching procedure described herein requires a repeat of the data flow sequence of FIG. 5 for each row of positions of block A in search area B starting from the top row of FIG. 3 and ending with the bottom row. Note in FIG. 5, the base addresses are omitted for simplicity. The base address can be left out in FIG. 5 because the base address remains the same throughout the entire data flow sequence of FIG. 5. However, in reality each address in FIG. 5 comprises a base address (not shown) as well as an index.

The first column in FIG. 5 denotes the time in form of a cycle number. The second column in FIG. 5 denotes the inputs received during each cycle, the $a(i,j)$'s representing pixel values from the block of the current frame and the $b(i,j)$'s representing pixel values from the search area of the previous frame. Except in the initial 16 cycles and in the last 16 cycles of the data flow sequence of FIG. 5, one pixel value $a(i,j)$ is inputted (via input 110) from the current frame during each cycle and two pixel values are inputted from the previous frame during each cycle, namely $b(i,j)$ via input 120 and $b(i-1, j+16)$ via input 122. The third column of FIG. 5 contains the calculations performed by $PE_0$ during each cycle, the fourth column contains the calculations performed by $PE_1$ during each cycle ... and the last column contains the calculations performed by $PE_{16}$ during each cycle. Each processor $PE_0 \ldots PE_{16}$ includes an accumulator (see FIG. 8) so that it can accumulate (i.e.) sum all of the calculations it performs. Thus, for example, $PE_0$ calculates its error function by accumulating (i.e. by summing) the results of all its calculations which are listed in the third column of FIG. 5.

The data flow sequence through the circuit 100 of FIG. 4 is now considered in detail with the aid of FIG. 5. Illustratively, this data flow sequence is performed first for the positions of block A in the top row of FIG. 3 and is then repeated for every row of positions of block A in FIG. 3.

(a) At cycle 0, $a(0,0)$ and $b(0,0)$ are inputted via inputs 110 and 120 respectively. Processor $PE_0$ computes $|a(0,0)\text{-}b(0,0)|$ and $a(0,0)$ is latched at delay flip-flop $DFF_{pl}$, which forms part of the bus structure 130.

(b) At cycle 1, $a(0,1)$ and $b(0,1)$ are inputted via the inputs 110 and 120 respectively. $b(0,1)$ is transported using bus structure 140 to processors $PE_0$ and $PE_1$, $a(0,0)$ is piped along bus structure 130 to processors $PE_1$, then $|a(0,1)-b(0,1)|$ is computed in processor $PE_0$ and $|a(0,0)-b(0,1)|$ is computed in processor $PE_1$. Also $a(0,0)$ is latched at delay flipflop $DFF_{p2}$ and $a(0,1)$ is latched at delay flipflop $DFF_{p1}$.

(c) At cycle 2, $a(0,2)$ and $b(0,2)$ are inputted ia the inputs 110 and 120 respectively. $b(0,2)$ is transported to $PE_0$, $PE_1$ and $PE_2$ via the bus structure 140, $a(0,0)$ is piped along the bus structure 130 to $PE_2$, $a(0,1)$ is piped along the bus structure 130 to $PE_1$, then $|a(0,2)-b(0,2)|$ is computed in $PE_0$, $a(0,1)-b(0,2)|$ is computed in $PE_1$ and $|a(0,0)-b(0,2)$ is computed in $PE_2$; $a(0,0)$ is latched at delay flip-flop $DFF_{p3}$, $a(0,1)$ is latched at $DFF_{p2}$ and $a(0,2)$ is latched at delay flip-flop $PFF_{p1}$.

This sequence proceeds through cycle 15. Starting at cycle 16 two pixel element values from the previous frame will be inputted and broadcast to the appropriate processors. Throughout the entire set of cycles shown in FIG. 5, the $a(i,j)$'s are sequentially pipelined along the bus structure 130 from one processor to the next by use of the delay elements $DFF_{pl} \ldots DFF_{p6}$.

(d) At cycle 16 $a(1,0)$ is inputted via input 110, $b(1,0)$ is input via input 120, and $b(0,16)$ is inputted via input 122. $b(1,0)$ is transported to processor PE0 using bus structure 140, $b(0,16)$ is transported to processors $PE_1$, $PE_2 \ldots PE_{16}$ also using bus structure 140. (The detailed operation of bus structure 140 is discussed below). Then $|a(1,0)\text{-}b(1,0)|$ is computed at processor $PE_0$, $|a(0,15)b(0,16)|$ is computed in processor $PE_1 \ldots$ and $|a(0,0)b(0,16)$ is computed in processor $PE_{16}$.

(e) At cycle 17 $a(1,1)$ is inputted via input 110 $b(1,1)$ is inputted via input 120, and $b(0,17)$ is inputted via input 122. $b(1,1)$ is transported to processor PE0 and $PE_1$, via bus structure 140 and, $b(0,17)$ is transported to processors $PE_2 \ldots PE_{16}$ also via bus structure 140. Then $|a(1,1)-b(1,1)|$ is computed in processor $PE_0$, $|a(1,0)b(1,1)|$ is computed in processor $PE_1$, $|a(0,15)-b(0,17)|$ is computed in processor $PE_2$ and .. . and $a(0,1)-b(0,17)$ is computed in processor $PE_{16}$.

At the end of cycle 255, processor $PE_0$ finishes receiving the pixel values for one error function calculation (e.g. the position block in A takes in the upper left-hand corner of FIG. 3). Within th next 16 cycles processors $PE_1$-$PE_{16}$ complete the reception of the pixel values for their corresponding error function calculations (e.g. for the remainder of the positions of block A in top row of FIG. 3). A few cycles after the reception of the input pixel values is completed by a processor, the processor provides the results of a completed error function calculation. The results of the error function calculations are then transferred to the comparator unit 160. The comparator unit 160 is discussed in detail below.

The sequence of cycles 0–271 of FIG. 5 is then repeated for each row in FIG. 3. In particular, to make most efficient use of the processors $PE_0 \ldots PE_{16}$, it is desirable to carry out cycles $16\times 16+0 \ldots 16\times 16+15$ (i.e. cycles 256 to 271) for one row of block positions in FIG. 3 while simultaneously carrying out cycles 0 . . . 15 for the next row of block positions. The possibility of this can easily be seen from FIG. 5. For example, cycle $16 \times 16 = 256$ utilizes only processors $PE_1 \ldots PE_{16}$ while cycle 0 utilizes only processor $PE_0$. Thus, the efficiency of the circuit 100 of FIG. 4 approaches 100%. It takes 4352 cycles to process each $16 \times 16$ block -° from the current frame. For each position in block A in search area B, FIG. 3 indicates the processor which computes the error function and the cycles in which the error function is computed.

If the circuit 100 has to process 256 $16 \times 16$ blocks in 1/15sec and 4352 cycles are required for each block then the cycle time should be on the order of 56 nanoseconds. This compares quite favorably with a cycle time of about 3 nanoseconds which would be necessary if the entire full search block matching algorithm were carried out using sequential rather than parallel processing. There are no commercially available memory families that can implement a 3 nanosecond access time.

After the error functions are calculated by the processors $PE_0 \ldots PE_{16}$ it is necessary to compare the error functions to determine which error function is minimum. This comparison is carried out by the comparator unit 160 of FIG. 4. The comparator unit 160 comprises two comparison circuits $C_0$ and $C_1$. The comparison circuits $C_0$ and $C_1$ each include a tristate buffer ($BUFFER_0$ and $BUFFER_1$), a buffer for storing a minimum value ($MIN_0$ and $MIN_1$) and a comparator ($COMPARATOR_0$ and $COMPARATOR_1$) When an error function is available after being calculated by one of the processors $PE_0 \ldots PE_{16}$, it is sent to the tristate buffer and the comparator of one of the comparison circuits $C_0$, $C_1$ If the newly available error function is larger than the value already stored in the minimum value buffer ($MIN_0$ or $MIN_1$), then a flag ($FLAG_0$ or $FLAG_1$) is zero and the value stored by the minimum value buffer is unchanged.

On the other hand if the newly available error function is smaller than the value stored in the minimum value storage buffer ($MIN_1$ or $MIN_0$), the flag ($FLAG_0$ or $FLAG_1$) becomes equal to 1 and the tristate buffer ($BUFFER_0$ or $BUFFER_1$) will replace the value in $MIN_0$ or $MIN_1$ with new error function. Thus the buffers $MIN_0$ and $MIN_1$ always store the smallest error functions yet received by $C_0$ and $C_1$. The reason for using two comparison circuits $C_0$ and $C_1$ is discussed below.

After the processors complete the calculation of their error functions, the results are transferred from the processors $PE_0$, $PE_1 \ldots PE_{16}$ to the associated tristate buffer devices $TRIBUF_0$, $TRIBUF_1$, . . . $TRIBUF_{16}$ which form part of the comparator unit 160 of FIG. 4. It should be noted that the processors $PE_0 \ldots PE_{16}$ complete their error function calculations one after the other over a period of seventeen cycles. Thus, an enable signal $EN_1$, sequentially enables the tristate buffer device $TRIBUF \ldots TRIBUF_{16}$. The enable signal $EN_1$ is passed along the chain of delay flip-flops 161 so that the tristate buffer devices $TRIBUF_0$, $TRIBUF_1 \ldots TR_{16}$ are enabled at the appropriate times. For example $TRIBUF_1$ is enabled one cycle after $TRIBUF_0$ While the newly calculated error functions arrive at a rate of one per cycle, the comparison circuits $C_0$ and $C_1$ require two cycles for the comparison and replacement procedure carried out therein. For this reason two comparison circuits $C_0$ and $C_1$ are utilized. Thus, the even number buffer devices $TRIBUF_0 \ldots TRIBUF_{16}$ are connected to the common bus 162 and the odd number buffer devices $TRIBUF_1$, $TRIBUF_3 \ldots TRIBUF_5$ are connected to the common bus 163. The bus 162 sequentially transports the error functions of the even numbered processors to the comparison circuit $C_0$ and the bus 163 sequentially transports the error functions of the odd numbered processors to the comparison circuit $C_1$. Thus each comparison circuit $C_0$ and $C_1$ receives an error function every two cycles. The comparison circuits $C_0$ and $C_1$ then perform the compare and replace procedure on each of the arriving error functions.

After a group of seventeen error functions have been processed by the comparison circuits $C_0$ and $C_1$, the enable signal $EN_1$ (after passing through the delay flip-flops (DFF) 161 and 171) arrives at $BUFFER_2$, which enables the value stored in $MIN_1$ to be transferred to $COMPARATOR_0$ in circuit $C_0$. Two cycles later the smaller value of $MIN_0$ and $MIN_1$ is stored in $BUFFER_3$ ready for further processing.

It should be noted that the values stored in $MIN_0$ and $MIN_1$ are not necessarily the smallest error function received by $C_0$ and $C_1$ in the last group of seventeen error functions calculated by the processors $PE_0 \ldots PE_{16}$, but rather contain the smallest error functions received by $C_0$ and $C_1$ so far for the block currently being matched. However, after the error functions for every row of block positions in FIG. 3 have been calculated and processed by the comparator unit 169 the minimum error function for the block being matched is present in the $BUFFER_3$. It should also be noted that each processor knows for which block positions it has calculated an error function. Accordingly, the block positions (e.g. the coordinates $m_k, m_l$ described above) may be outputted with the error function so that the displacement information is readily obtainable when the minimum error function is determined.

The address generator 150 is now discussed in more detail. A schematic diagram of the address generator appears in FIG. 6. Each address e.g. $I_a+i$, $J_a+j$ and $I_b+i$, $J_b+j$ comprises a base address e.g. $I_a, J_a$ and running indices e.g. i,j. The base addresses are generated by the base address generator 152 and the indices are generated by the index generator 154.

Figure 7:
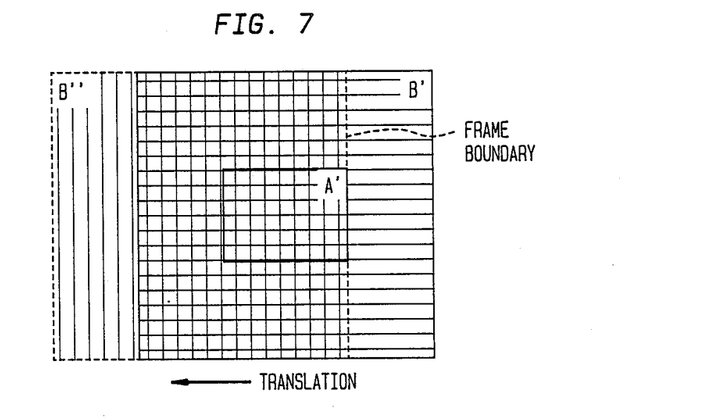
FIG. 7 schematically illustrates a boundary translation procedure performed by the address generator of FIG. 6.

The boundary translation circuit 156 solves the following problems. Consider what happens when a block from the current frame is on the frame boundary. An example of such a block is labeled A' in FIG. 1. As shown in FIG. 7, the search area B, (horizontal batching in FIG. 7) for the block A' of the current frame extends outside the previous frame, when the search area is defined so that an $M \times N$ block has an $(M+2T)(N+2T)$ search area having the same center as the block. Thus, the right-hand portion of the search area B' is outside the frame boundary as shown in FIG. 7. The boundary condition translator circuit 156 translates the addresses comprising the search area B' and other search areas which extend outside the frame boundary so that they are located inside the frame boundary Thus the search area B' is translated to the search area designated B" (vertical hatching) in FIG. 7. The search area B" lies entirely inside the frame boundary. The boundary condition translation circuit 156 does nothing if the search area does not extend over the frame boundary.

The indices generated by the index generator 154 of the address generator 150 and the base addresses generated by the base address generator 152 (with or without translation) are summed by the adder 158 to produce the addresses $I_a+i$, $J_a+j$ and $I_b+i$, $J_b+j$. These addresses are then transmitted to the above-mentioned frame store buffers to retrieve the corresponding pixel values $a(I_a+i, J_a+j)$, $b(I_b+i, J_b+j)$.

The bus structures 130, 140 of FIG. 4 are now discussed in greater detail. As indicated above, the bus structure 130 comprises a chain of delay elements or flip-flops $DFF_{p1} \ldots DFF_{p15}$. Pixel values from the current frame (i.e. the $a(i,j)$'s) are transmitted along the bus structure 130 from one delay element to the next so that they arrive at the appropriate processors at the appropriate times.

The bus structure 140 serves as a common bus for broadcasting pixel values from the previous frame (i.e. $b(i,j)$ from the top and $b(i-1,J+16)$ from the bottom to the appropriate processors. This feature saves a lot of silicon area when the circuit of FIG. 4 is implemented using VLSI. However, the bus 140 has to be divided into two sub-buses at the right place at the right time so that $b(i,j)$ is delivered to the appropriate processors and $b(i-1,J+16)$ is delivered to the appropriate processors. In particular, in FIG. 5 each row starting with cycle 16 includes a vertical line. The pixel value $b(i,j)$ is delivered to the processor to the right of the line and the pixel value $b(i-1,j+16)$ is delivered to the processor to the right of the line. The bus is divided by sending a key signal every 16 cycles to turn off one of the pass transistors 142 of the bus 140. When one of the transistors 142 is turned off, data coming from the top of bus (i.e. from input 120) and data coming from the bottom of the bus cannot propagate past the turned off transistor 142. The key signal is generated by logic (not shown) associated with the address generator 150. The key signal propagates cycle by cycle from $DFF_{k1}$ to $DFF_{k15}$ to turn off the appropriate pass transistor at the appropriate time.

The processors $PE_0 \ldots PE_{16}$ are now discussed in greater detail. One of the processors is schematically illustrated in FIG. 8. The processor of FIG. 8 comprises three function blocks. The subtractor 185 receives the pixel values $a(i,j)$ and $b(i,j)$ and computes the difference. The absolute value circuit 186 then takes the absolute value of the result of the subtractor circuit, and the absolute values are accumulated in the accumulator 187. Thus the accumulator sums all of the calculations in the appropriate column of FIG. 5. Note, that the processor of FIG. 8 computes the mean absolute error. Alternatively, the mean square error may be computed in which case a squaring circuit replaces the absolute value circuit 186 in FIG. 8.

In short, a circuit for implementing a full search block matching algorithm has been disclosed. Pixel values from a block of the current frame and the search area of the previous frames are received by the circuit sequentially. These pixel values are then distributed by means of internal bus structures to a plurality of processors which calculate in parallel a group of error functions for a group of positions of the block of the current frame in the search area of the previous frame. The circuit has a very high efficiency and may be implemented as a single VLSI chip.

Finally, the above described embodiments of the invention are intended to be illustrative only. Numerous alternative embodiments may be devised by those skilled in the art without departing from the spirit and scope of the following claims.

What is claimed is:

1. A circuit for implementing a full search block matching algorithm comprising first input means for sequentially receiving pixel values from a block of pixels in a current video frame, second input means for sequentially receiving pixel values from a search area of a previous video frame, a plurality of processors for calculating in parallel using said pixel values a group of error functions corresponding to a group of positions of said block in said search area, a first bus structure for transporting said sequentially received pixel values from said block to said processors, a second bus structure for transporting said sequentially received pixel values from said search area to said processors, and comparison means for comparing said error functions.

a plurality of processors for calculating in parallel a group of error functions corresponding to a group of positions of said block in said search area, a first bus structure for transporting said sequentially received pixel values from said block to said processors, a second bus structure for transporting said sequentially received pixel values from said search area to said processors, and comparison means for comparing said error functions wherein said second input means comprises two distinct inputs for sequentially receiving pixel values from said search area.

2. The circuit of claim 1 wherein said circuit further includes an address generator for generating addresses for said pixel values.

3. A circuit for implementing a full search block matching algorithm comprising first input means for sequentially receiving pixel values from a block of pixels in a current video frame, second input means for sequentially receiving pixel values from a search area of a previous video frame, 4. The circuit of claim 3 wherein said second bus structure extends between said two distinct inputs.

5. The circuit of claim 4 wherein said second bus structure includes means for dividing the second bus structure into first and second sub-bus structures, said first sub-bus structure being adapted to transport a pixel value received via one of said two distinct inputs to a first group comprising one or more of said processors and said second sub-bus structure being adapted to transport a pixel value received via the other of said two distinct inputs to a second group comprising one or more of said processors.

6. A circuit for implementing a full search block matching algorithm comprising first input means for sequentially receiving pixel values from a block of pixels in a current video frame, second input means for sequentially receiving pixel values from a search area of a previous video frame, a plurality of processors for calculating in parallel a group of error functions corresponding to a group of positions of said block in said search area, a first bus structure for transporting said sequentially received pixel values from said block to said processors, a second bus structure for transporting said sequentially received pixel values from said search area to said processors, and comparison means for comparing said error functions
wherein said first bus structure comprises a series of delay elements, for pipelining said pixel values of said block sequentially to each of said processors.

7. A full search method for finding the best match position of a block from a current video frame in a search area of a previous video frame, said method comprising the steps of:
sequentially receiving pixel values of said block at a first input of a circuit,
sequentially receiving pixel values of said search area at second and third inputs of said circuit,
using said pixel values for calculating in parallel by means of a plurality of processors comprising part of said circuit a group of error functions corresponding to a group of positions of said block in said search area, and
comparing said error functions.

8. A circuit for implementing a full search block matching algorithm for picture transmission comprising
input means for sequentially receiving pixel values from a block of pixels in a current picture frame and for sequentially receiving pixel values from a search area of a previous picture frame,
a plurality of processors for calculating in parallel a group of error functions corresponding to a group of positions of said block in said search area in response to said sequentially received pixel values from said block and said sequentially received pixel values from said search area at said input means, and
comparison means for comparing said error functions.

9. A circuit in accordance with claim 8 further comprising first bus means connecting said input means to said processors for transporting said sequentially received pixel values from said current frame to said processors and second bus means connecting said input means to said processors for transporting said sequentially received pixel values from said search area to said processors.

10. A circuit for implementing a full search block matching algorithm for picture transmission comprising
input means for sequentially receiving pixel values from a block of pixels in a current picture frame and for sequentially receiving pixel values from a search area of a previous picture frame,
a plurality of processors for calculating in parallel a group of error functions corresponding to a group of positions of said block in said search area in response to said sequentially received pixel values from said block and said sequentially received pixel values from said search area at said input means, and
comparison means for comparing said error functions
wherein said comparison means includes a plurality of sequentially enabled buffer means each connected to one of said processors and further includes comparison circuits connected to said buffer means.

11. A circuit in accordance with claim 10 wherein said comparison circuits comprise a first comparison circuit connected to even ones of said buffer means and a second comparison circuit connected to odd ones of said buffer means.

12. A circuit for implementing a full search block matching algorithm for picture transmission comprising
input means for sequentially receiving pixel values from a block of pixels in a current picture frame and for sequentially receiving pixel values from a search area of a previous picture frame,
a plurality of processors for calculating in parallel a group of error functions corresponding to a group of positions of said block in said search area in response to said sequentially received pixel values from said block and said sequentially received pixel values from said search area at said input means, and
comparison means for comparing said error functions
said circuit further comprising address generator means for retrieving pixel values to said input means and including boundary translation circuit means for translating addresses of search area outside a frame boundary so that they are located within the frame boundary.

13. A circuit for implementing a full search block matching algorithm for picture transmission comprising
input means for sequentially receiving pixel values from a block of pixels in a current picture frame and for sequentially receiving pixel values from a search area of a previous picture frame,
a plurality of processors for calculating in parallel a group of error functions corresponding to a group of positions of said block in said search area in response to said sequentially received pixel values from said block and said sequentially received pixel values from said search area at said input means, and
comparison means for comparing said error functions
said circuit further comprising first bus means including a series of delay elements for applying to said processors said sequentially received pixel values from said block and second bus means connecting two distinct inputs of said input means to said processors for applying thereto said sequentially received pixel values from said search area.

14. A circuit in accordance with claim 13 further comprising means for splitting said second bus to prevent propagation of pixel values from one or the other of said distinct inputs to certain of said processors.

* * * * *

UNITED STATES PATENT AND TRADEMARK OFFICE
CERTIFICATE OF CORRECTION

PATENT NO. : 4,897,720
DATED : January 30, 1990
INVENTOR(S) : Lancelot Wu and Kun-Min Yang It is certified that error appears in the above-indentified patent and that said Letters Patent is hereby corrected as shown below:

Column 7, line 22, "b(Ib+i,J) should read --b($I_b$+i,$J_b$+j)--.
Column 8, line 16, "ia" should read --via--;
         line 34, "PE0" should read --$PE_0$--;
         line 36, "...PE16" should read --...$PE_{16}$--;
         line 39, "|a(0,15)b(0,16)| should read --|a(0,15)-b(0,16)|--;
         line 40, "|a(0,0)b(0,16)" should read --|a(0,0)-b(0,16)--;
         line 43, "PE0" should read --$PE_0$--;
         line 47, "|a(1,0)b(1,1)" should read --|a(1,0)-b(1,1)--;
         line 53, "th" should read --the--.
Column 9, line 7, after "block" delete " °";
         line 30, after ")" add --.--;
         line 34, after "$C_1$" add --.--;
         line 60, "$TR_{16}$" should read --$TRIBUF_{16}$--;
         line 62, "TRIBUFO" should read --$TRIBUF_0$.--.
Column 10, line 48, "B" should read --B'--;
          line 59, "boundary" should read --boundary.--.
Column 11, line 29, "of bus" should read --of the bus--.
Column 12, claims (See correct claims 1-6 attached.)

UNITED STATES PATENT AND TRADEMARK OFFICE
CERTIFICATE OF CORRECTION

PATENT NO. : 4,897,720
DATED : January 30, 1990
INVENTOR(S) : Lancelot Wu and Kun-Min Yang It is certified that error appears in the above-indentified patent and that said Letters Patent is hereby corrected as shown below:

1. A circuit for implementing a full search block matching algorithm comprising first input means for sequentially receiving pixel values from a block of pixels in a current video frame, second input means for sequentially receiving pixel values from a search area of a previous video frame, a plurality of processors for calculating in parallel using said pixel values a group of error functions corresponding to a group of positions of said block in said search area, a first bus structure for transporting said sequentially received pixel values from said block to said processors, a second bus structure for transporting said sequentially received pixel values from said search area to said processors, and comparison means for comparing said error functions.

UNITED STATES PATENT AND TRADEMARK OFFICE
CERTIFICATE OF CORRECTION

PATENT NO. : 4,897,720
DATED : January 30, 1990
INVENTOR(S) : Lancelot Wu and Kun-Min Yang It is certified that error appears in the above-indentified patent and that said Letters Patent is hereby corrected as shown below:

2. A circuit for implementing a full search block matching algorithm comprising first input means for sequentially receiving pixel values from a block of pixels in a current video frame, second input means for sequentially receiving pixel values from a search area of a previous video frame, a plurality of processors for calculating in parallel a group of error functions corresponding to a group of positions of said block in said search area, a first bus structure for transporting said sequentially received pixel values from said block to said processors, a second bus structure for transporting said sequentially received pixel values from said search area to said processors, and

UNITED STATES PATENT AND TRADEMARK OFFICE
CERTIFICATE OF CORRECTION

PATENT NO. : 4,897,720  
DATED : January 30, 1990  
INVENTOR(S) : Lancelot Wu and Kun-Min Yang Page 4 of 6

It is certified that error appears in the above-indentified patent and that said Letters Patent is hereby corrected as shown below:

comparison means for comparing said error functions wherein said second input means comprises two distinct inputs for sequentially receiving pixel values from said search area.

3. The circuit of claim 2 wherein said second bus structure extends between said two distinct inputs.

4. The circuit of claim 3 wherein said second bus structure includes means for dividing the second bus structure into first and second sub-bus structures, said first sub-bus structure being adapted to transport a pixel value received via one of said two distinct inputs to a first group comprising one or more of said processors and said second sub-bus structure being adapted to transport a pixel value received via the other of said two distinct inputs to a second group comprising one or more of said processors.

UNITED STATES PATENT AND TRADEMARK OFFICE
CERTIFICATE OF CORRECTION

PATENT NO. : 4,897,720
DATED : January 30, 1990
INVENTOR(S) : Lancelot Wu and Kun-Min Yang It is certified that error appears in the above-indentified patent and that said Letters Patent is hereby corrected as shown below:

5. A circuit for implementing a full search block matching algorithm comprising first input means for sequentially receiving pixel values from a block of pixels in a current video frame,     second input means for sequentially receiving pixel values from a search area of a previous video frame,     a plurality of processors for calculating in parallel a group of error functions corresponding to a group of positions of said block in said search area,     a first bus structure for transporting said sequentially received pixel values from said block to said processors,     a second bus structure for transporting said sequentially received pixel values from said search area to said processors, and

UNITED STATES PATENT AND TRADEMARK OFFICE
CERTIFICATE OF CORRECTION

PATENT NO.  : 4,897,720
DATED       : January 30, 1990
INVENTOR(S) : Lancelot Wu and Kun-Min Yang It is certified that error appears in the above-indentified patent and that said Letters Patent is hereby corrected as shown below:

comparison means for comparing said error functions wherein said first bus structure comprises a series of delay elements, for pipelining said pixel values of said block sequentially to each of said processors.

6. The circuit of claim 1 wherein said circuit further includes an address generator for generating addresses for said pixel values.

Signed and Sealed this

Twelfth Day of July, 1994

Attest:

BRUCE LEHMAN

*Attesting Officer*   *Commissioner of Patents and Trademarks*